Figures 1, 2:
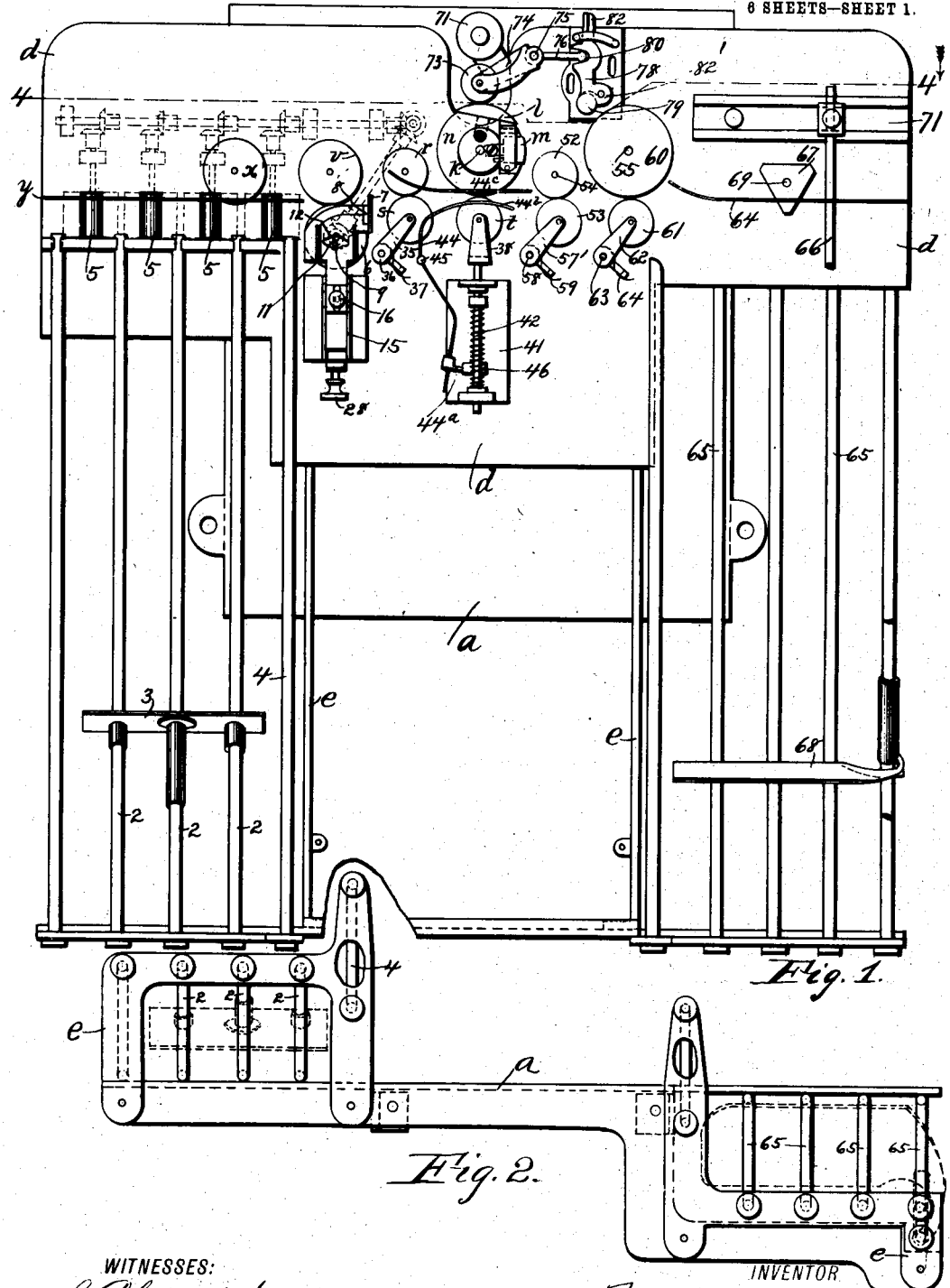

No. 835,094. PATENTED NOV. 6, 1906.
F. BJURSTRÖM.
STAMP CANCELING AND POSTMARKING MACHINE.
APPLICATION FILED JULY 8, 1904.

6 SHEETS—SHEET 1.

WITNESSES:
L. Almquist
C. Sedgwick

INVENTOR
Fredrik Bjurström
BY
A. P. Thayer
ATTORNEY

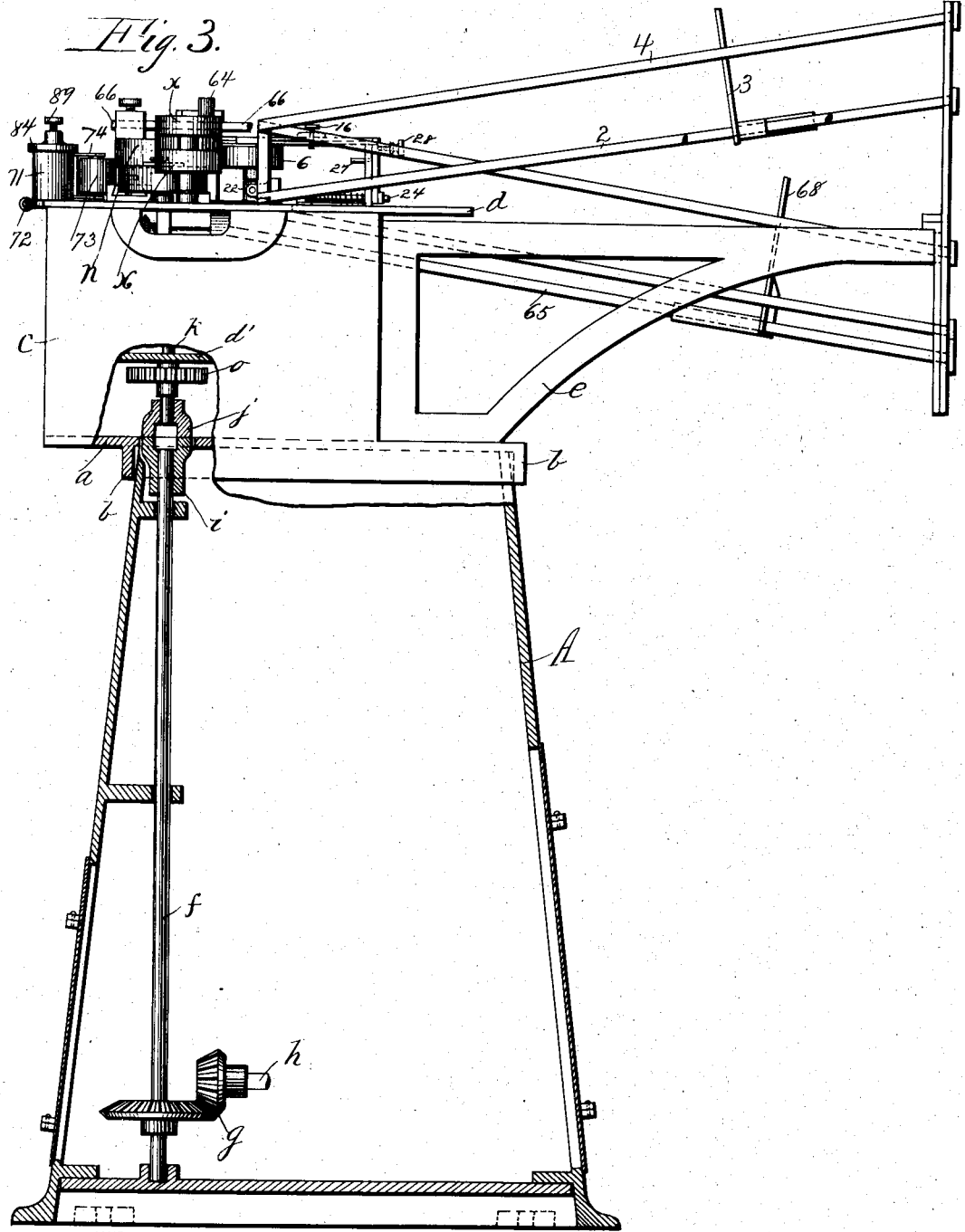

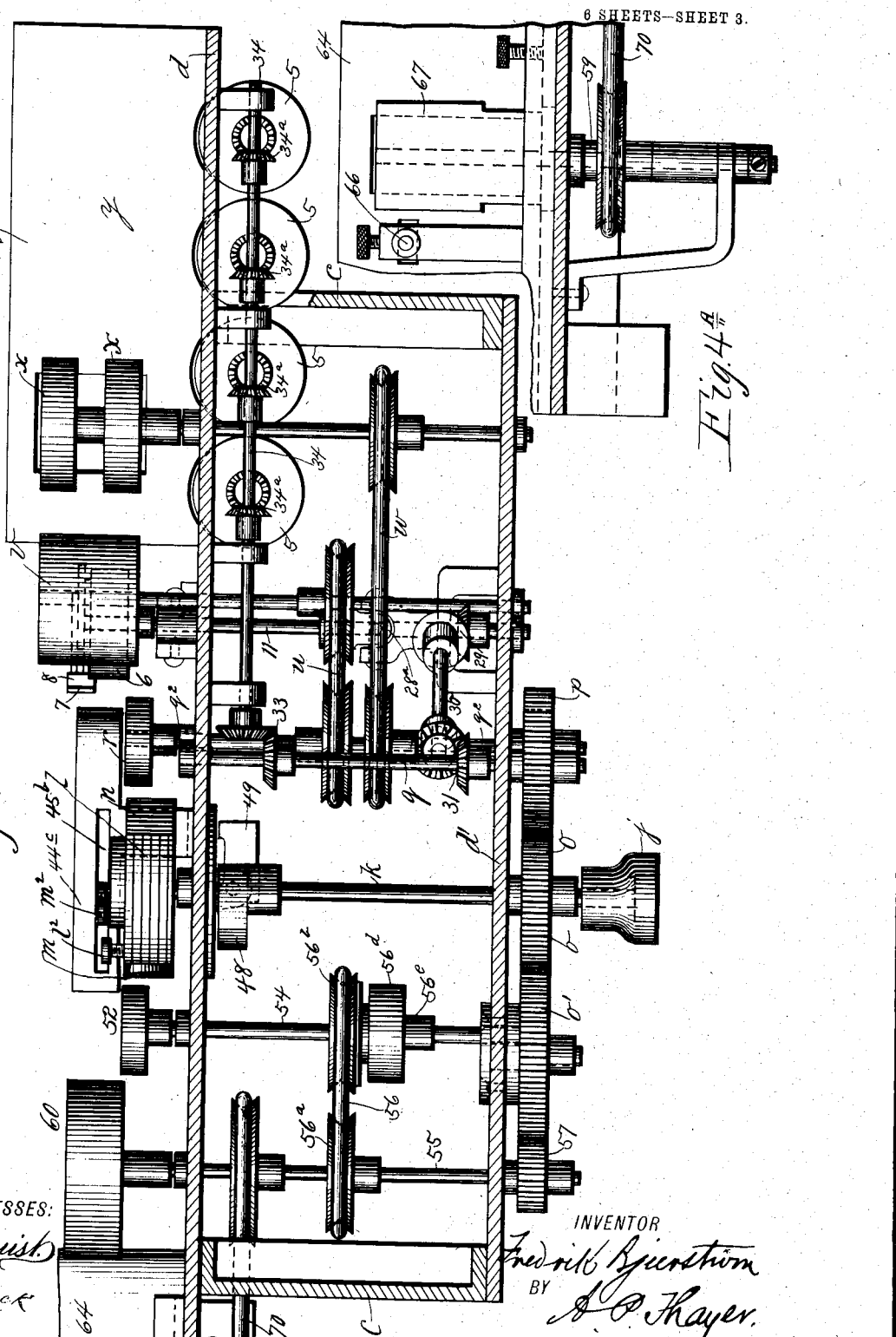

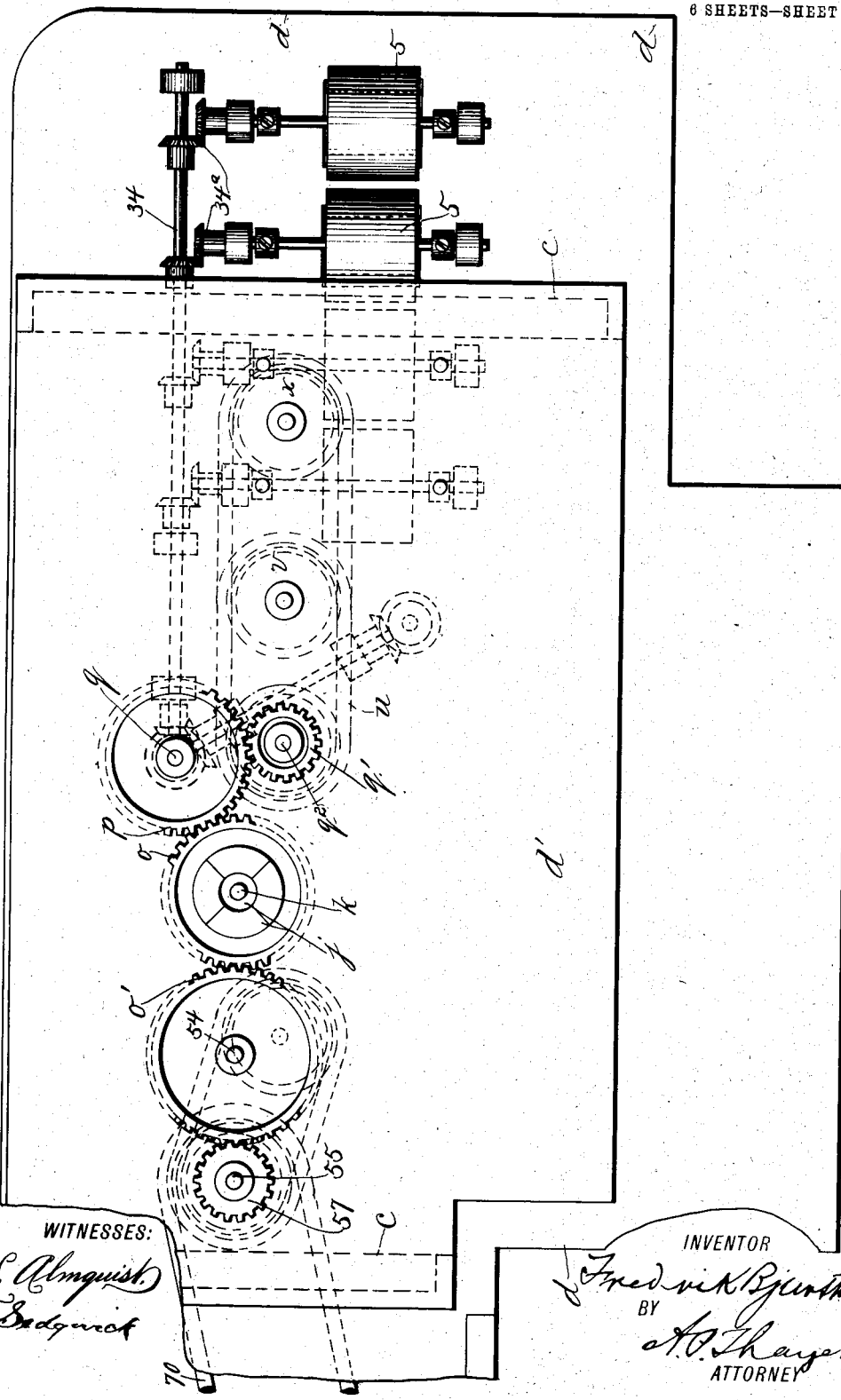

No. 835,094. PATENTED NOV. 6, 1906.
F. BJURSTROM.
STAMP CANCELING AND POSTMARKING MACHINE.
APPLICATION FILED JULY 8, 1904.
6 SHEETS—SHEET 5.
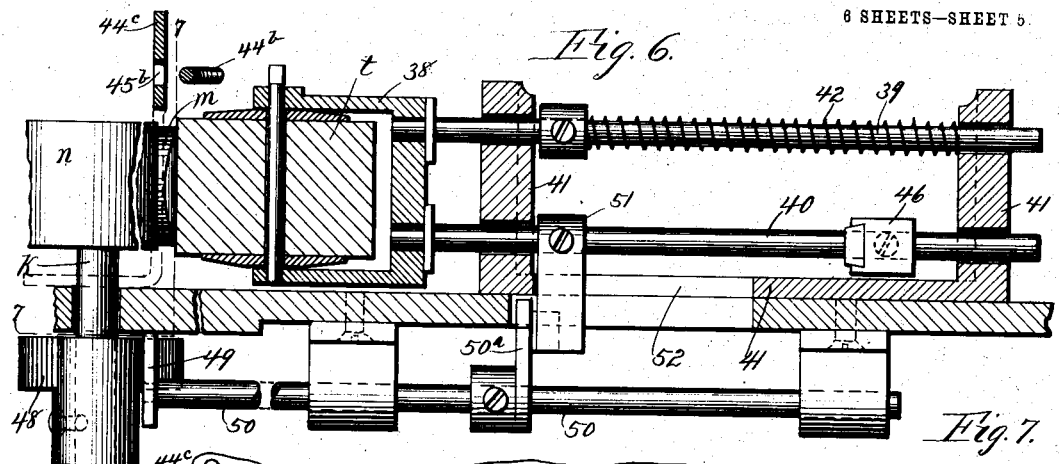
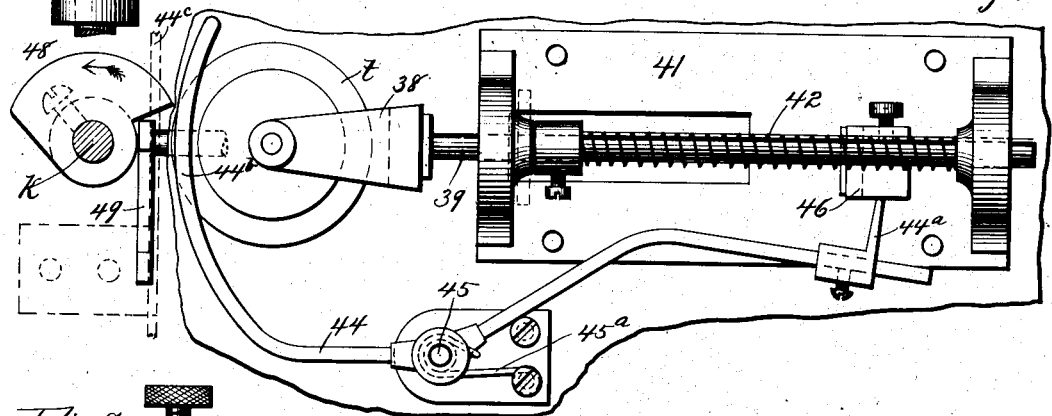
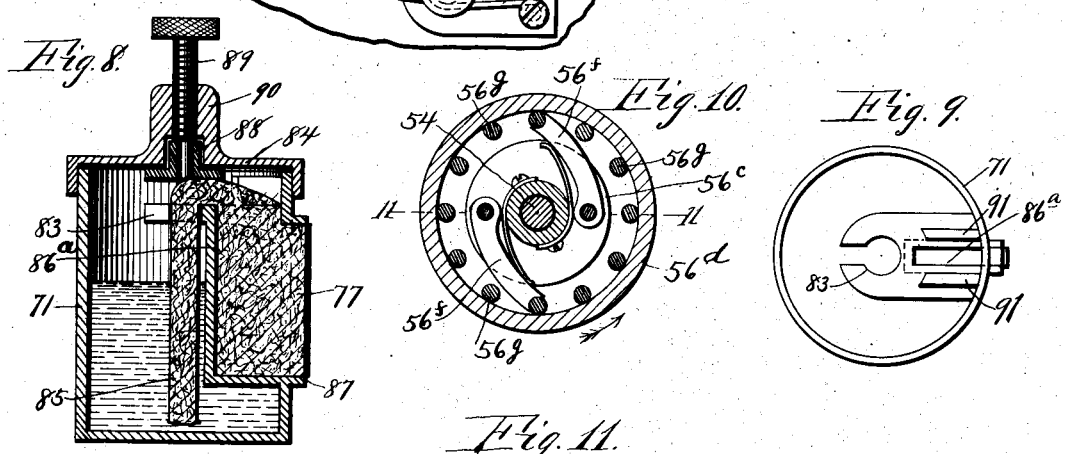
WITNESSES:
L. Almquist
C. Sedgwick
INVENTOR
Fredrik Bjurström
BY
A. R. Thayer
ATTORNEY No. 835,094. PATENTED NOV. 6, 1906.
F. BJURSTROM.
STAMP CANCELING AND POSTMARKING MACHINE.
APPLICATION FILED JULY 8, 1904.
6 SHEETS—SHEET 6.
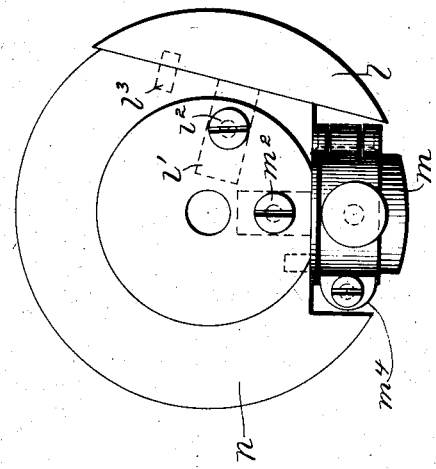
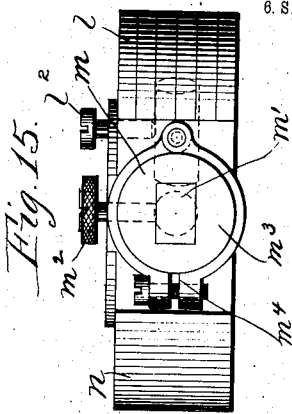
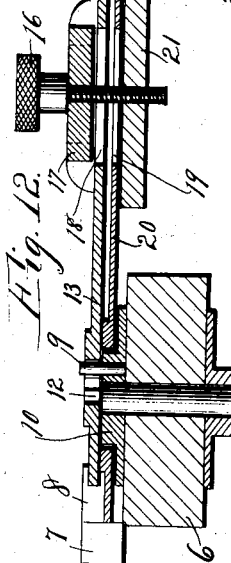
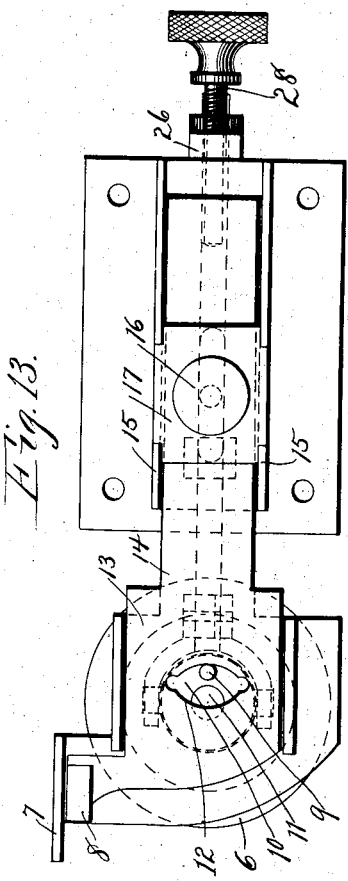
WITNESSES:
INVENTOR
Fredrik Bjurstrom
BY
A. O. Thayer.
ATTORNEY

UNITED STATES PATENT OFFICE.

FREDRIK BJURSTRÖM, OF NEW YORK, N. Y.

STAMP-CANCELING AND POSTMARKING MACHINE.

No. 835,094.      Specification of Letters Patent.      Patented Nov. 6, 1906.

Application filed July 8, 1904. Serial No. 215,834.

*To all whom it may concern:*

Be it known that I, FREDRIK BJURSTRÖM, a citizen of the United States of America, and a resident of the borough of Manhattan, New York city, and State of New York, have invented certain new and useful Improvements in Stamp-Canceling and Postmarking Machines, of which the following is a specification.

My invention relates to stamp-canceling and postmarking apparatus in which the letters are placed in batches edgewise on a descending chute arranged laterally to a line of feeding, stamping, marking, and delivering rolls, from which they pass on to another lateral descending chute for removal after the stamping and canceling; and the invention consists of certain combinations, constructions, and arrangements of apparatus, as hereinafter described, reference being made to the accompanying drawings, in which—

Figure 1 is a plan view of my improved machine. Fig. 2 is a detail in side elevation as seen looking from the bottom of the sheet containing said Fig. 1. Fig. 3 is an end elevation as seen at the left-hand side of Fig. 1, with the supporting-base in section. Fig. 4 is a longitudinal vertical section on line 4 4 of Fig. 1 as viewed in the direction indicated by the arrow at the upper right-hand corner of Fig. 1. Fig. 4$^a$ is a part of Fig. 4 detached on account of the limitation of the sheet. Fig. 5 is a plan of the part of the machine shown in Fig. 4 inverted. Fig. 6 is a detail in vertical section of apparatus controlling the pressure of the letters against the canceling and stamping dies. Fig. 7 is a plan view of the apparatus of Fig. 6 with a part sectioned on line 7 7 of said Fig. 6. Fig. 8 is a vertical section of the ink-holder and feeder. Fig. 9 is a plan view of the ink-holder with the cover removed. Fig. 10 is a horizontal section of a clutch of one of the delivery feed-rolls, permitting overrunning of the last feed-roll at higher speed for accelerating the delivery and affording clearance between the letters to avoid conflict between them. Fig. 11 is a vertical section of said clutch on line 11 11 of Fig. 10. Fig. 12 is a detail in sectional elevation of apparatus for effecting the individual separation of the letters feeding into the stamping-dies. Fig. 13 is a plan view of the apparatus shown in section in Fig. 12. Fig. 14 is a plan view of the canceling and stamping dies and their carrying-roll. Fig. 15 is a face view of the canceling and stamping apparatus of Fig. 14.

A represents a stand of any suitable construction supporting the bottom plate $a$ of a case, having a pendent flange $b$ embracing the top of the stand for confining the case in position, on which plate are upright plates $c$, one at each end, supporting a table $d$, said table and a plate $d'$, pendent from the table, being the supports of the bearings of various upright shafts and gearing employed in the mechanism to be described. The plate $a$ and sides $c$ also support lateral brackets $e$, carrying the infeeding and outfeeding letters to be stamped and discharged.

The stand A supports an upright shaft $f$, to which the power is to be applied in any approved way, as by the bevel-wheels $g$ and a main driving-shaft $h$, and it carries a part $i$ of a coupling at its upper end for engaging by the counterpart $j$ with the vertical shaft $k$, which carries at its upper end above table $d$ the canceling-die $l$ and the postmarking-die $m$, which are attached by the disk-head $n$ of said shaft $k$. These dies $l$ and $m$ are detachably connected to head $n$, as usual, for readily changing and adjusting them when required. The die $l$ has a stem $l'$, (dotted, Fig. 14,) entering a socket of the head $n$, with a set-screw $l^2$ for clamping it fast and a dowel-pin $l^3$. The die $m$ has a central detachable part $m'$, with a set-screw $m^2$ for fastening it, and a surrounding part $m^3$, also removable and fastened with a clamp $m^4$. The disk-head $n$ is notched in the periphery for space in which to place the clamp. The means of connecting and securing these dies may, however, be varied at will.

The shaft $k$ carries below plate $d'$ a spur-wheel $o$, that gears with a spur-wheel $p$ on the shaft $q$, which gears with spur-wheel $q'$ on a shaft $q^2$, carrying feed-roll $r$ on its upper end, which coacts with feed-roll $s$ to deliver the envelops to the die-head $n$, with which presser-roll $t$ coacts.

Shaft $q^2$ drives by a belt $u$ and suitable pulleys the feed-roll $v$ and also drives by another belt $w$ and suitable pulleys the feed-roll $x$. Said shaft $q$ drives by the bevel-wheels 33 the line-shaft 34 with which the feed-rolls 5 respectively gear by bevel-wheels 34$^a$ for their operation, and it also drives by bevel-wheels 31 shaft 30 and bevel-wheels 29, shaft 11 carrying roll 6.

The letters to be stamped and canceled are placed edgewise in batches on the descending feedway-rods 2 in front of pusher 3 and with one end against gage-rod 4 and gently shoved along by the pusher 3 on to rolls 5 and up against a guard-plate $y$ and roll $x$. Said roll pushes the one in advance along to another roll $v$ against a stop 7, which temporarily arrests the forward movement of the letter, while a reversely-revolving retarding-roll 6, coacting with roll $v$, holds back the rest in case any others stick to the first, so as to be carried along with it until a lateral pusher 8 is thrust forward by the crank-pin 9, carried by the disk 10 on the upper end of the shaft 11, to which roll 6 is attached for being operated, said crank-pin working in a slot 12 of the slide-plate 13, carrying pusher 8, the shank of which, 14, works in a slideway 15, in which it is confined by a clamp-screw 16 set in a bridge 17 and reaching through a slot 18 of the said shank and the slot 19 of the slideway-plate 20 into the base 21. (See Figs. 12 and 13.)

It is desirable that the roll 6 be capable of yielding under excessive pressure, as when any hard substance contained in a letter happens to enter between rolls $v$ and 6, and it is also desirable that roll 6 may be adjusted slightly relatively to roll $v$ for assorted letters of different thickness. The clamp-screw 16 is therefore not too tightly set in, so that the shank of slide-plate 13 and the slide-plate 20 may shift back, and shaft 11 is mounted in a bearing 22 just below roll 6, that is carried on one end of a sliding rod 23, having bearings 24 in the supporting-base and provided with a coiled spring 25 to maintain normal pressure of roll 6 against roll $v$.

On the outer end of rod 23 an arm 26 is rigidly attached, extending upward along the side of the supporting-base and has a stud-pin 27 sliding in and out of a hole in the supporting-base to steady the arm, and said arm also carries a temper-screw 28 to adjust roll 6 relatively to roll $v$ for the letters of varying thickness. The shaft 11 has a universal joint at $28^a$ to allow roll 6 to be thus adjusted. This feed apparatus is, however, not claimed herein, being the subject of a divisional application, filed January 19, 1905, Serial No. 241,726.

The pressure-roll $s$ coacting with roll $r$ is mounted on forked arms 35, pivoted at 36 for yielding to excessive pressure, and a spring 37 is provided to press said roll against roll $r$. Roll $t$ (see Figs. 6 and 7) is carried in a fork 38, having two shank-rods 39 and 40, slidably supported in the base 41, with a coiled spring 42 on rod 39 to press it up into bearing contact with the die-roll $n$. The other rod 40 controls the fork against rotation in the bearings by the arm 51 working in the slot 52 of the base. The roll $t$ has to be opened relatively to the die-roll for admitting the letters between them freely, for which shaft $k$ carries a cam 48 below the cable $d$, which at the proper time takes effect on a shoe 49, carried on the end of a slidable rod 50, which has an arm $50^a$ taking effect on arm 51 of rod 40 and opening roll $t$ as soon as the letters are engaged by the succeeding rolls 53 and 54. When so opened, an elbow-lever 44, pivoted at 45 and ranging at one end over the feedway of the envelops just above the die-roll and roll $t$ and at the other end carrying a stop-finger $44^a$, is made by a spring $45^a$ to swing said finger in front of the stop-lug 46 on rod 40 and hold said roll $t$ open until the next envelop enters between roll $t$ and the die-roll to be treated. The tripping of the stop 46 at this time to allow roll $t$ to grip the letter is caused by the letter entering between part $44^b$ of lever 44 and the guard-plate $44^c$, along which the letters pass and having a slot $45^b$, in which said part $44^c$ of the lever rests while holding-roll $t$ is open and crowding said lever back, so as to release finger $44^a$ from stop 46 when roll $t$ closes and the parts assume the positions represented in Fig. 7. Immediately following the die-roll $n$ and the pressure-roll $t$ the envelops enter between rolls 52 and 53. The roll 52 is carried on the upright shaft 54, which is driven from the shaft 55 by pulleys $56^a$ and $56^b$ and belt 56. Wheel $o'$ drives shaft 55 by pinion 57, and the roll 53 is mounted in the forked arms 57', pivoted at 58 and having a spring 59 to maintain the pressure against roll 52. The shaft 55 carries delivery-roll 60, with which a presser-roll 61 coacts, which is mounted in the forked arms 62, pivoted at 63 and having a spring 64 to press roll 61 onto roll 60 for the proper bite on the envelops. From rolls 60 and 61 the envelops pass along the guard-plate 64, set up edgewise at the head of the descending-chute rods 65 until stopped by the gage-rod 66 in front of a triangular-shaped rotating pusher 67, the points of which crowd the letters one after another against the retarder 68, which slides down the chute with sufficiently retarding friction to maintain the upright edgewise condition of the envelops. This retarder is shifted up to close proximity to the pusher at the beginning of the operation, the previously stamped and canceled batch having been removed. The pusher-shaft 69 is driven from shaft 55 by a belt 70 and suitable pulleys. The stop-gage 66 is adjustable along ways 71, in which it is supported to adapt it for letters of different lengths which are assorted properly for different adjustments of the gage to begin with.

It is desirable that the feed movement of the letters be accelerated after they escape from the die-roll for better clearance of each other in entering upon the discharge-way. Therefore the delivery feed-roll 60 is made larger for greater surface speed and roll 52 is provided with driving mechanism allowing it to overrun. For this purpose the shaft 54, carrying the roll 52, has its driving-pulley 56$^b$ fitted loosely on it to allow the shaft to overrun said pulley when the letters enter the grip between rolls 60 and 61, which by the greater surface speed of roll 60 accelerates the delivery. The hub 56$^c$ of said pulley runs in an inwardly-toothed flange 56$^d$ of a hub 56,$^e$ keyed fast to the shaft, and carries pawls 56$^f$, which the ratchet-hub overruns, while the letters are subject to the accelerated speed of roll 60, and which engage the ratchet-teeth 56$^g$ and drive at the normal rate of speed due to pulleys 56$^a$ 56$^b$ and the belt 56 when the overrunning ceases.

For the application of the ink to the dies $l$ and $m$ an ink-fountain 71 is provided in suitable proximity to the die-roll and detachably secured in any approved way, as by a clamp, (indicated at 72,) for ready application and removal, with a distributing-roll 73 intermediate of them to receive the ink from the wick 77 and deliver it to the dies. It is mounted on a shifting support 74, pivoted at 75 and having a lever-arm 76, by which to swing it against the feeding-wick 77 of the fountain from time to time to replenish the charge of ink and to swing away from the die-roll entirely when the ink-fountain is removed for cleaning the dies from time to time. A keeper-latch 78, pivoted at 79 and having a notch 80 to engage the end of the lever-arm, is provided to hold the distributing-roll in the working position. A spring 81 (dotted, Fig. 1) keeps said latch in engagement with said lever-arm, and a finger-piece 82 on the free end facilitates the application of the fingers for manipulating the latch.

The ink-fountain contains a centrally-located wick-holder 83 directly under the cover 84, in which a wick 85, preferably of round form, is suspended with the upper end turned over the top of a partition 86, separating a passage-way 86$^a$ from the main body of the fountain to a lateral slot 87, through the side in which the before-mentioned wick 77 is placed for contact with the roll 73. Where the wick 85 turns over the top of the partition 86, a clamp-disk 88 is fixed with an adjusting-screw 89 in the center boss 90 of the cover to regulate the feed of the ink by clamping the wick more or less tightly. The vertical guard-flanges 91, upwardly projecting on each side above the top of passage-way 86$^a$, are intended to prevent overflow of ink from the upper end of the wick backward into the body of the fountain. The inking apparatus is, however, not claimed herein, being the subject of a divisional application, filed January 19, 1905, Serial No. 241,727.

What I claim as my invention is—

1. The combination with a canceling and postmarking roll, of feed-rolls thereto, rolls in advance of the feed-rolls and a reversely-revolving retarding-roll operating in conjunction with one of the latter, two sets of discharging-rolls adapted to operate at different speeds, a lateral feedway-pusher for supplying the letters to the feed-rolls, and means for operating said rolls.

2. The combination with a canceling and postmarking roll, of feed-rolls thereto, rolls in advance of the feed-rolls and a reversely-revolving retarding-roll operating in conjunction with one of the latter, two sets of discharging-rolls adapted to operate at different speeds, a descending lateral feedway to the feeding-rolls, a pusher on said feedway, and means for operating said rolls.

3. The combination with a canceling and stamping roll, feed-rolls thereto and two sets of discharge-rolls therefrom, of the reversely-operating retarding-roll of the feed-train, means for automatic adjustment of said retarding-roll consisting of the flexible joint and the spring-pressed bearing-support of the shaft of said roll, and means for operating the several rolls.

4. The combination with a canceling and stamping roll, feed-rolls thereto and discharge-rolls therefrom, of the reversely-operating retarding-roll of the feed-train, means for automatic adjustment of said retarding-roll, means for adjusting said roll at the will of the operator, consisting of the flexible joint, the spring-pressed bearing-support of the shaft of the said roll, temper-screw and stud-pin controlling said bearing-support, and means for operating the several rolls.

5. The combination with a canceling and stamping roll, feed-rolls thereto and discharge-rolls therefrom, of the reversely-operating retarding-roll of the feed-train, controlling-stop, pusher adapted for releasing the letters singly from said stop, means for operating said pusher consisting of the crank-pin of said retarding-roll-operating shaft, and the slotted stop-carrying shank; and means for operating the several rolls.

6. The combination of a stamp-canceling and postmarking roll, feed-rolls and two sets of discharge-rolls, and means for operating them, means for automatically retracting the companion roll to the die-roll for releasing the canceled and stamped letters when engaged by the discharging-rolls, and retaining said retracted roll for entry of the succeeding letters, means for releasing said roll through the instrumentality of the entering letters, and means for automatically closing said roll on the entering letters.

7. The combination of a stamp-canceling and postmarking roll, feed-rolls and discharging-rolls and means for operating them, means for automatically retracting the companion roll to the feed-roll for releasing the canceled and stamped letters when engaged by the discharging-rolls, and retaining said retracted roll for entry of the succeeding letters, means for releasing said roll through the instrumentality of the entering letters, and means for automatically closing said roll on the entering letters, said means consisting of the sliding support to said companion roll, cam on the die-roll shaft for retracting said support, guard-plate and elbow-lever between which the letters pass on entering the die-rolls, stop on the sliding support, stop-finger on the elbow-lever, and the spring actuating the sliding support.

8. The combination of a stamp-canceling and postmarking roll, feed-rolls and two sets of discharging-rolls, and means for operating them, the terminal discharging-rolls having greater surface speed for accelerating the discharge, and the driven roll of the preceding pair delivering thereto having connection with its driver permitting acceleration of its speed when the faster terminal delivery-roll takes effect on the letters.

9. The combination of a stamp-canceling and postmarking roll, feed-rolls and two sets of discharging-rolls, and means for operating them, the terminal discharging-rolls having greater surface speed for accelerating the discharge, and the driven roll of the preceding pair delivering thereto having an overrunning clutch connection with its driver permitting acceleration of its speed when the faster delivery-roll takes effect on the letters, said overrunning clutch consisting of the loose driving-pulley and pawls operating the said preceding roll at normal speed and the ratchet-hub keyed on the shaft and adapted to overrun the pulley and pawls when subject to the accelerated speed of the letters in the terminal rolls.

Signed at New York this 24th day of June, 1904.

FREDRIK BJURSTRÖM.

Witnesses:
C. SEDGWICK,
J. M. HOWARD.